United States Patent
Kanbe et al.

(10) Patent No.: US 9,245,567 B2
(45) Date of Patent: Jan. 26, 2016

(54) MAGNETIC RECORDING MEDIUM AND MAGNETIC STORAGE APPARATUS

(71) Applicant: SHOWA DENKO K.K., Tokyo (JP)

(72) Inventors: Tetsuya Kanbe, Chiba (JP); Kazuya Niwa, Chiba (JP); Yuji Murakami, Chiba (JP); Lei Zhang, Chiba (JP)

(73) Assignee: SHOWA DENKO K.K., Tokyo (JP)

( * ) Notice: Subject to any disclaimer, the term of this patent is extended or adjusted under 35 U.S.C. 154(b) by 0 days.

(21) Appl. No.: 14/305,118

(22) Filed: Jun. 16, 2014

(65) Prior Publication Data
US 2014/0376127 A1    Dec. 25, 2014

(30) Foreign Application Priority Data
Jun. 20, 2013 (JP) ................. 2013-129883

(51) Int. Cl.
G11B 5/66 (2006.01)
G11B 5/738 (2006.01)
G11B 5/65 (2006.01)
G11B 5/73 (2006.01)

(52) U.S. Cl.
CPC *G11B 5/738* (2013.01); *G11B 5/65* (2013.01); *G11B 5/66* (2013.01); *G11B 5/7325* (2013.01)

(58) Field of Classification Search
None
See application file for complete search history.

(56) References Cited

U.S. PATENT DOCUMENTS

| | | | |
|---|---|---|---|
| 6,068,739 A | 5/2000 | Suzuki et al. | |
| 7,829,208 B2 | 11/2010 | Peng et al. | |
| 2005/0214590 A1* | 9/2005 | Maeda et al. | 428/832 |
| 2006/0183004 A1* | 8/2006 | Hattori et al. | 428/833.1 |
| 2009/0155628 A1 | 6/2009 | Lee et al. | |
| 2012/0307398 A1* | 12/2012 | Kanbe et al. | 360/75 |
| 2014/0030552 A1* | 1/2014 | Inaba et al. | 428/828 |
| 2014/0093748 A1* | 4/2014 | Chen et al. | 428/831 |
| 2014/0308542 A1* | 10/2014 | Zhang et al. | 428/831.2 |
| 2015/0016236 A1* | 1/2015 | Sakawaki et al. | 369/13.24 |
| 2015/0029830 A1* | 1/2015 | Zhang et al. | 369/13.4 |
| 2015/0036242 A1* | 2/2015 | Zhang et al. | 360/135 |

FOREIGN PATENT DOCUMENTS

| | | |
|---|---|---|
| JP | 11-353648 | 12/1999 |
| JP | 2009-146558 | 7/2009 |

OTHER PUBLICATIONS

Akira Yano et al., "FePt fct Phase Ordered Alloy Thin Film Prepared by 30-s Annealing With Fe—O Under-Layer", IEEE Trans. Magn., vol. 41, No. 10, pp. 3211-3213, Oct. 2005.

Yoshiko Tsuji et al., "Structure and magnetic property of c-axis oriented L10-FePt nanoparticles on TiN/a-Si underlayers", J. Vac. Sci. Technol. B25(6), pp. 1892-1895, Nov./Dec. 2007.

En Yang et al., "Epitaxial Growth of L10-FePt Granular Thin Films on TiC/RuAl Underlayers", IEEE Trans. Magn. vol. 47, No. 10, pp. 4077-4079, Oct. 2011.

Ikuya Tagawa et al., "Relationship between high density recording performance and particle coercivity distribution", IEEE Trans. Magn., vol. 27, No. 6, pp. 4975-4977, Nov. 1991.

* cited by examiner

*Primary Examiner* — Holly Rickman
(74) *Attorney, Agent, or Firm* — IPUSA, PLLC

(57) ABSTRACT

A magnetic recording medium includes a substrate, a magnetic layer including a FePt alloy having a $L1_0$ type structure, and a plurality of underlayers arranged between the substrate and the magnetic layer, wherein at least one of the plurality of underlayers includes $TiO_2$.

14 Claims, 2 Drawing Sheets

MAGNETIC RECORDING MEDIUM AND MAGNETIC STORAGE APPARATUS

CROSS-REFERENCE TO RELATED APPLICATIONS

This application is based upon and claims the benefit of priority of the prior Japanese Patent Application No. 2013-129883 filed on Jun. 20, 2013, the entire contents of which are incorporated herein by reference.

BACKGROUND OF THE INVENTION

1. Field of the Invention

The present invention relates to a magnetic recording medium and a magnetic storage apparatus.

2. Description of the Related Art

Recently, demands to increase storage capacities of HDDs (Hard Disk Drives) are increasing. As one means of satisfying such demands, a heat-assisted recording method and a microwave-assisted recording method have been proposed. The heat-assisted recording method performs recording with respect to a magnetic recording medium using a magnetic head mounted with a laser diode, by heating the magnetic recording medium by the magnetic head. The microwave-assisted recording method performs recording on the magnetic recording medium by applying a high-frequency magnetic field of 10 GHz or higher from the magnetic head.

The heat-assisted recording method can reduce the coercivity of the magnetic recording medium by heating the magnetic recording medium and enable use of a material having a high crystal magnetic anisotropy constant Ku (hereinafter also referred to as a "high-Ku material") for a magnetic layer of the magnetic recording medium. For this reason, the magnetic grain size of the magnetic layer can be reduced while maintaining thermal stability, and a surface recording density on the order of 1 Tbits/inch$^2$ can be achieved.

On the other hand, the microwave-assisted recording method can perform the recording with respect to the magnetic recording medium with a recording magnetic field lower than or equal to the coercivity of the magnetic recording medium, by the assistance of the high-frequency magnetic field generated from an STO (Spin Torque Oscillator) mounted on the magnetic head. For this reason, similarly as in the case of the heat-assisted recording method, the microwave-assisted recording method can use a high-Ku material for the magnetic layer of the magnetic recording medium.

Ordered alloys, such as $L1_0$ type FePt alloys, $L1_0$ type CoPt alloys, $L1_1$ type CoPt alloys, and the like, have been proposed for the high-Ku material. In addition, in order to separate crystal grains of the ordered alloy, the magnetic layer is added with a grain boundary material, such as an oxide including $SiO_2$, $TiO_2$, or the like, or C, BN, or the like. By employing a granular structure in which the magnetic crystal grains are separated at the grain boundary, a high medium SNR (Signal-to-Noise Ratio) can be achieved.

When the $L1_0$ type FePt alloy described above is used for the magnetic layer, a (001) orientation in which the c-axis is perpendicular to the layer surface is desirable in order to achieve a high perpendicular magnetic anisotropy. It is known that the orientation of the $L1_0$ type FePt alloy is controllable by an underlayer.

For example, Japanese Laid-Open Patent Publication No. 11-353648 proposes forming the $L1_0$ type FePt alloy on an underlayer that is made of MgO, NiO, or the like and is controlled to have a (100) face parallel to the substrate surface, in order to obtain the (001) orientation of the $L1_0$ type FePt alloy.

In addition, Japanese Laid-Open Patent Publication No. 2009-146558 and U.S. Pat. No. 7,829,208 propose forming the $L1_0$ type FePt magnetic layer on an underlayer that is made of ZrN, TaN, CrN, or the like and has an NaCl type structure, in order to obtain satisfactory (001) orientation of the $L1_0$ type FePt magnetic layer.

Furthermore, Akira Yano et al., "FePt fct Phase Ordered Alloy Thin Film Prepared by 30-s Annealing With Fe—O Under-Layer", IEEE Trans. Magn., Vol. 41, No. 10, pp. 3211-3213, October 2005, Yoshiko Tsuji et al., "Structure and magnetic property of c-axis oriented $L1_0$-FePt nanoparticles on TiN/a-Si underlayers", J. Vac. Sci. Technol. B25(6), pp. 1892-1895, November/December 2007, and En Yang et al., "Epitaxial Growth of $L1_0$-FePt Granular Thin Films on TiC/RuAl Underlayers", IEEE Trans. Magn. Vol. 47, No. 10, pp. 4077-4079, October 2011 propose forming the $L1_0$ type FePt magnetic layer on a FeO underlayer, a TiN underlayer, and a TiC underlayer respectively having the NaCl type structure, in order to obtain the (001) orientation of the $L1_0$ type FePt magnetic layer.

Recently, there are demands to improve the medium SNR of the magnetic recording medium. However, although the perpendicular magnetic anisotropy can be improved by making the $L1_0$ type FePt alloy included in the magnetic layer have the (001) orientation, a sufficient improvement of the medium SNR may be difficult to achieve.

SUMMARY OF THE INVENTION

Embodiments of the present invention may provide a magnetic recording medium and a magnetic storage apparatus which can achieve high medium SNR.

According to one aspect of the present invention, a magnetic recording medium may include a substrate; a magnetic layer including a FePt alloy having a $L1_0$ type structure; and a plurality of underlayers arranged between the substrate and the magnetic layer, wherein at least a first underlayer amongst the plurality of underlayers includes $TiO_2$.

Other objects and further features of the present invention will be apparent from the following detailed description when read in conjunction with the accompanying drawings.

DESCRIPTION OF THE PREFERRED EMBODIMENTS

Figure 1:
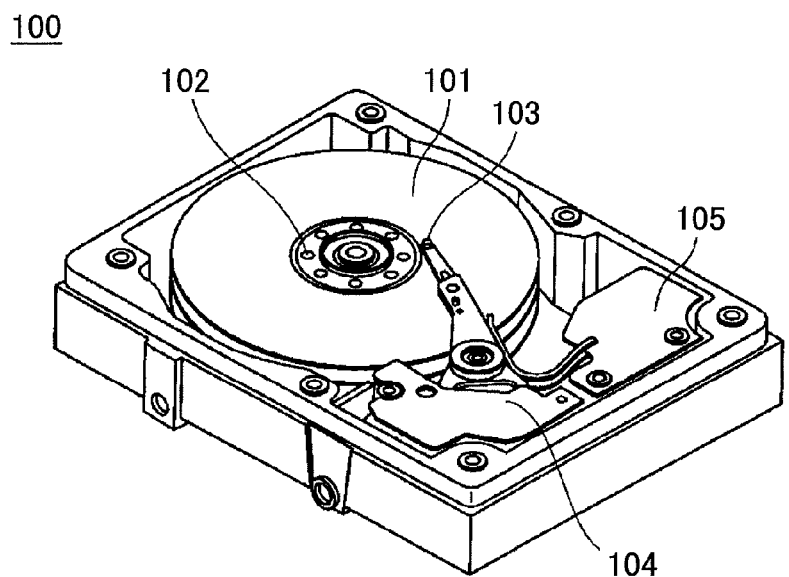
FIG. 1 is a perspective view illustrating a magnetic storage apparatus in a second embodiment of the present invention.

A description will be given of the magnetic recording medium and the magnetic storage apparatus in each embodiment of the present invention, by referring to the drawings. The present invention is not limited to the described embodi-

First Embodiment

A description will be given of an example of a configuration of the magnetic recording medium in a first embodiment of the present invention.

The magnetic recording medium in this embodiment may include a substrate, a magnetic layer including an FePt alloy having an $L1_0$ type structure, and a plurality of underlayers arranged between the substrate and the magnetic layer. At least one of the plurality of underlayers includes $TiO_2$.

A description will be given of the layers forming the magnetic recording medium.

The substrate is not limited to a particular type of substrate. For example, a glass substrate may be used for the substrate, and a heat-resistant glass substrate may preferably be used for the substrate.

As described above, the plurality of underlayers are formed on the substrate, and at least one of the plurality of underlayers includes $TiO_2$. Properties of the plurality of underlayers are described below.

First, a lattice mismatch between the underlayer and the $L1_0$ type FePt alloy is preferably small, in order to optimize the (001) orientation of the FePt alloy included in the magnetic layer and having the $L1_0$ type structure. However, according to studies made by the present inventors, atomic ordering may be improved by applying tensile stress in an in-plane direction of the $L1_0$ type FePt alloy. For this reason, a lattice constant of the underlayer preferably has a value that enables suitable tensile stress to be applied in the in-plane direction of the $L1_0$ type FePt alloy.

Second, the $L1_0$ type FePt alloy is preferably formed at a high temperature of 600° C. or higher, in order to promote the ordering of the $L1_0$ type FePt alloy included in the magnetic layer. Hence, at least the underlayer immediately under the magnetic layer is preferably made of a material that is chemically stable and has a melting point higher than that of a deposition temperature of the $L1_0$ type FePt alloy. When the melting point of the underlayer immediately under the magnetic layer is lower than the deposition temperature of the $L1_0$ type FePt alloy, the underlayer material may diffuse into the $L1_0$ type FePt alloy at the time of the deposition of the $L1_0$ type FePt alloy, which should preferably be avoided.

$TiO_2$ is known to take a tetragonal rutile type structure, a tetragonal anatase type structure, and an orthorhombic brookite type structure. Table 1 illustrates values of an a-axis length, a b-axis length, and a c-axis length of $TiO_2$ for each of these structures. In this case, the melting point of $TiO_2$ is higher than the deposition temperature of the $L1_0$ type FePt alloy.

TABLE 1

| Crystal Structure | Crystal System | a (nm) | b (nm) | c (nm) |
|---|---|---|---|---|
| Anatase | Tetragonal | 0.378 | 0.378 | 0.951 |
| Rutile | Tetragonal | 0.454 | 0.454 | 0.296 |
| Brookite | Orthorhombic | 0.545 | 0.917 | 0.514 |

For example, the a-axis length of $TiO_2$ having the rutile type structure is 0.474 nm, which is approximately 16% longer than the a-axis length (0.385 nm) of the $L1_0$ type FePt alloy. However, the magnetic layer including the $L1_0$ type FePt alloy can be epitaxially grown on the underlayer including $TiO_2$ having the rutile type structure. In this case, the underlayer including $TiO_2$ preferably has a (100) orientation because the $L1_0$ type FePt alloy has the (001) orientation. The underlayer including $TiO_2$ having the (100) orientation means that the (100) face of the underlayer including $TiO_2$ is oriented parallel to the substrate surface.

Because the tensile stress is applied in the in-plane direction of the magnetic layer including the $L1_0$ type FePt alloy when the magnetic layer including the $L1_0$ type FePt alloy is formed on the underlayer including $TiO_2$ having the rutile type structure, the FePt alloy having the $L1_0$ type structure becomes satisfactorily ordered as described above. Hence, a magnetic recording medium having a high perpendicular magnetic anisotropy can be obtained by forming such a magnetic layer on the underlayer including $TiO_2$.

The $TiO_2$ included in the underlayer including $TiO_2$ is not limited to the rutile type structure, and $TiO_2$ having the anatase type structure or $TiO_2$ having the brookite type structure may be used for the underlayer including $TiO_2$. In addition, the tensile stress may similarly be applied in the in-plane direction of the magnetic layer including the FePt alloy having the $L1_0$ type structure when a plurality of types of $TiO_2$ coexist within the underlayer including $TiO_2$. Further, components other than $TiO_2$, such as TiO and $Ti_2O_3$, may also coexist within the underlayer including $TiO_2$. A percentage of such components coexisting within the underlayer including $TiO_2$ is preferably selected so as not to deteriorate the (001) orientation of the magnetic layer. The underlayer including $TiO_2$ preferably includes the rutile type $TiO_2$ because the a-axis length of $TiO_2$ having the rutile type structure is closer to the a-axis length of the FePt alloy having the $L1_0$ type structure compared to $TiO_2$ having other structures. It is particularly preferable that the rutile type $TiO_2$ forms a primary component of the underlayer including $TiO_2$. For example, amongst the underlayers including $TiO_2$, a proportion of the rutile type $TiO_2$ is preferably 70% or higher. In the case in which the rutile type $TiO_2$ forms the primary component of the underlayer including $TiO_2$, the $L1_0$ type FePt alloy included in the magnetic layer becomes ordered in a particularly satisfactory manner, and a satisfactory (001) orientation can be obtained. It is particularly preferable that the $TiO_2$ included in the underlayer is the rutile type $TiO_2$.

Next, a description will be given of an example of the configuration of the underlayers other than the underlayer including $TiO_2$.

As described above, the $TiO_2$ included in the underlayer including $TiO_2$ preferably includes the $TiO_2$ having the rutile type structure as the primary component. In addition, the $TiO_2$ included in the underlayer including $TiO_2$ preferably has the (100) orientation.

A method of making the underlayer including $TiO_2$ include the rutile type $TiO_2$ as the primary component and have the (100) orientation is not limited to a particular method. For example, the underlayer including $TiO_2$ is preferably formed on the underlayer made of Cr or an alloy having a BCC (Body-Centered Cubic) structure and including Cr as its primary component. In other words, the plurality of underlayers may preferably include the underlayer made of Cr or the alloy having the BCC structure including Cr as its primary component, and the underlayer including $TiO_2$ formed on the underlayer made of Cr or the alloy having the BCC structure including Cr as its primary component.

In the following description, the underlayer made of Cr will also be referred to as a "Cr underlayer". In addition, the underlayer made of the alloy having the BCC structure including Cr as its primary component will also be referred to as a "Cr alloy underlayer".

First, a description will be given of a case in which the underlayer including $TiO_2$ is formed on the Cr underlayer.

Because the a-axis length of Cr is 0.288 nm, $\sqrt{2} \times 0.288 = 0.408$ nm is close to the a-axis length of $TiO_2$ having the rutile type structure. For this reason, when the $TiO_2$ layer is formed on the Cr underlayer, the $TiO_2$ layer that is formed becomes the rutile type structure and displays the (100) orientation by being epitaxially grown with a relationship Cr<100>//$TiO_2$<100>. In this case, the Cr underlayer preferably has the (100) orientation.

A method of forming the Cr underlayer having the (100) orientation is not limited to a particular method. For example, the Cr underlayer may be formed on an underlayer made of an amorphous alloy. In this case, the Cr underlayer is preferably formed by setting the substrate temperature to 200° C. or higher.

For example, the amorphous alloy may preferably include alloys such as Cr-50 at % Ti, Cr-50 at % Ta, Co-50 at % Ti, Ti-50 at % Al, Ni-50 at % Ti, Ni-50 at % Ta, and the like.

Next, a description will be given of a case in which the underlayer including $TiO_2$ is formed on the Cr alloy underlayer that is formed by the alloy having the BCC structure and including Cr as its primary component.

For example, the alloy having the BCC structure and including Cr as its primary component may include Cr alloys having the BCC structure and added with elements such as Ti, V, Mn, W, Mo, Ta, Nb, B, Ru, and the like to the primary Cr component.

Preferable features may be obtained by adding the above described elements with respect to the primary Cr component, in that the lattice constant increases, and the lattice mismatch with respect to the $TiO_2$ having the rutile type structure decreases. Accordingly, a $TiO_2$ underlayer having a further improved (100) orientation can be obtained. However, adding an excessive amount of the above described elements with respect to the primary Cr component may deteriorate the (100) orientation of the Cr alloy, and the added amount of the elements is preferably approximately 50 at % or less.

An underlayer made of an alloy or element having the BCC structure and an even larger lattice constant may be formed on the Cr underlayer or the Cr alloy underlayer. More particularly, one or more elements (metals) having the BCC structure selected from Mo, W, Ta, and Nb, or an alloy having the BCC structure and including one or more elements selected from Mo, W, Ta, and Nb may be used for the underlayer having the BCC structure and the larger lattice constant formed on the Cr underlayer or the Cr alloy underlayer. In this case, the underlayer including $TiO_2$ may be formed on the underlayer having the BCC structure and the larger lattice constant formed on the Cr underlayer or the Cr alloy underlayer. Accordingly, in the case in which the underlayer including $TiO_2$ includes as its primary component the $TiO_2$ having the rutile type structure, the lattice mismatch with respect to the $TiO_2$ having the rutile type structure can further be reduced, and the (100) orientation of the underlayer including $TiO_2$ can further be improved.

The underlayer including $TiO_2$ may be formed on an underlayer made of a material having a B2 structure. In addition, the underlayer including $TiO_2$ may be formed on an underlayer made of a material having a first NaCl type structure. In this case, the underlayer made of the material having the B2 structure, or the underlayer made of the material having the first NaCl type structure preferably has the (100) orientation.

For example, the material having the B2 structure may include NiAl and RuAl alloy. In addition, the material having the first NaCl type structure may include MgO, TiN, TaN, ZrN, CrN, TiC, TaC, ZrC, or the like, for example, and MgO is a particularly preferable material.

As described above, the underlayer made of the material having the B2 structure, or the underlayer made of the material having the first NaCl type structure preferably has the (100) orientation, and a method of making the underlayer have the (100) orientation is not limited to a particular method. For example, the underlayer made of such materials may be made to have the (100) orientation by forming the underlayer on the Cr underlayer having the (100) orientation or the Cr alloy underlayer having the (100) orientation.

Further, a soft magnetic underlayer may be formed in order to improve a write characteristic. For example, the soft magnetic underlayer may be made of an amorphous alloy, a microcrystalline alloy, a polycrystalline alloy, or the like. Examples of the amorphous alloy may include CoTaZr, CoFeTaB, CoFeTaSi, CoFeTaZr, and the like. Examples of the microcrystalline alloy may include FeTaC, FeTaN, and the like. Examples of the polycrystalline alloy may include NiFe, and the like. The soft magnetic underlayer may be formed by a single layer, or a multi-layer structure in which antiferromagnetically coupled soft magnetic underlayers sandwich an Ru layer having a suitable thickness, where the soft magnetic underlayers are made of one of the alloys described above.

An underlayer made of a material having a second NaCl type structure may be formed between the underlayer including $TiO_2$ and the $L1_0$ type FePt magnetic layer. In other words, the underlayer made of the material having the second NaCl type structure may be formed on the underlayer including $TiO_2$, and the $L1_0$ type FePt magnetic layer may be formed on the underlayer made of the material having the second NaCl type structure.

In this case, a thickness of the underlayer made of the material having the second NaCl type structure is not limited to a particular thickness. For example, the thickness (greater than zero) of the underlayer made of the material having the second NaCl type structure may preferably be 5 nm or less, and may more preferably be 3 nm or less. By making the thickness of the underlayer made of the material having the second NaCl type structure 5 nm (or more preferably 3 nm) or less, a lattice constant of the underlayer made of the material having the second NaCl type structure can be made close to the lattice constant of the underlayer including $TiO_2$, due to the tensile stress generated from the underlayer including $TiO_2$. For this reason, a tensile stress in the in-plane direction can be applied with respect to the FePt alloy included in the magnetic layer and having the $L1_0$ type structure, and the FePt alloy having the $L1_0$ type structure becomes satisfactorily ordered. A material having the NaCl type structure and included in the underlayer made of the material having the second NaCl type structure is not limited to a particular material. For example, the material having the NaCl type structure may include materials having a melting point higher than that of $TiO_2$, such as MgO, TiN, TaN, ZrN, TiC, TaC, ZrC, or the like, and MgO is a particularly preferable material. By using the material having the higher melting point than $TiO_2$, the thermal diffusion from the underlayer to the magnetic layer can be suppressed.

In the magnetic recording medium in this embodiment, the magnetic layer includes the FePt alloy having the $L1_0$ type structure. The magnetic layer is preferably formed on a stacked structure formed by the plurality of underlayers, and for example, the magnetic layer may be formed directly on the underlayer including $TiO_2$. In addition, another underlayer may be formed between the underlayer including $TiO_2$ and the magnetic layer.

It is preferable to perform a thermal process when forming the magnetic layer, in order to promote the ordering of the magnetic layer. In this case, elements such as Ag, Au, Cu, Ni, or the like may be added to the FePt alloy having the $L1_0$ type structure, in order to reduce the heating temperature (or ordering temperature). By adding such elements to the FePt alloy having the $L1_0$ type structure, the heating temperature (or substrate temperature) at the time of forming the magnetic layer can be reduced to a range of approximately 400° C. to approximately 500° C.

In addition, crystal grains of the FePt alloy having the $L1_0$ type structure are preferably magnetically isolated within the magnetic layer. In order to achieve this magnetic isolation, the magnetic layer preferably includes the FePt alloy having the $L1_0$ type structure as its primary component, and one or more kinds of elements selected from $SiO_2$, $TiO_2$, $Cr_2O_3$, $Al_2O_3$, $Ta_2O_5$, $ZrO_2$, $Y_2O_3$, $CeO_2$, MnO, TiO, ZnO, C, B, $B_2O_3$, and BN. Such a composition of the magnetic layer more positively separates the exchange coupling amongst the crystal grains, and can further improve the medium SNR.

The magnetic layer including the FePt alloy having the $L1_0$ type structure as its primary component means that the FePt alloy having the $L1_0$ type structure has the highest content in molecular ratio amongst the components included within the magnetic layer. Particularly, the magnetic layer preferably includes, in volume ratio, 50 vol % or more of the FePt alloy having the $L1_0$ type structure.

The magnetic layer may be formed by a plurality of magnetic layers. For example, the magnetic layer preferably includes a first magnetic layer including the FePt alloy having the $L1_0$ type structure as its primary component and $TiO_2$ amounting to 8 mol % or higher and 30 mol % or lower, and a second magnetic layer including the FePt alloy having the $L1_0$ type structure as its primary component and one or more kinds of elements selected from $SiO_2$, $TiO_2$, $Cr_2O_3$, $Al_2O_3$, $Ta_2O_5$, $ZrO_2$, $Y_2O_3$, $CeO_2$, MnO, TiO, ZnO, C, $B_2O_3$, and BN.

For example, the following layers or parts, other than the underlayer, may also be provided.

For example, a DLC (Diamond-Like Carbon) protection layer is preferably formed on the magnetic layer.

A method of forming the DLC protection layer is not limited to a particular method. For example, the DLC protection layer may be formed by RF-CVD (Radio Frequency-Chemical Vapor Deposition) that forms the layer by decomposing a source gas made of hydrocarbons using high-frequency plasma, IBD (Ion Beam Deposition) that forms the layer by ionizing the source gas using electrons emitted from a filament, FCVA (Filtered Cathodic Vacuum Arc) that forms the layer using a solid C target without using a source gas, or the like.

A thickness of the DLC protection layer is not limited to a particular thickness. For example, the thickness of the DLC protection layer is 1 nm or greater and 6 nm or less. The thickness less than 1 nm is undesirable in that the floating characteristic of the magnetic head may deteriorate. On the other hand, the thickness greater than 6 nm is undesirable in that the magnetic spacing increases and the medium SNR may deteriorate.

A lubricant layer may be formed on the DLC protection layer. For example, the lubricant layer may be formed by coating a lubricant made of a perfluoropolyether fluorocarbon polymer, or the like.

Layers other than those described above, such as a seed layer, a bonding layer, or the like may be provided if necessary.

According to the magnetic recording medium in this embodiment, at least one of the plurality of underlayers includes $TiO_2$. Hence, the ordering of the FePt alloy having the $L1_0$ type structure and included in the magnetic layer can be improved, and at the same time, the SFD (Switching Field Distribution) can be reduced because poorly ordered magnetic grains are excluded. As a result, a magnetic recording medium having high-Ku and low normalized coercivity variance $\Delta Hc/Hc$ can be provided. Because the lower the normalized coercivity variance $\Delta Hc/Hc$ the higher the medium SNR, it is possible to increase the medium SNR.

The magnetic recording medium in this embodiment may be used as a magnetic recording medium for a magnetic storage apparatus employing the heat-assisted recording method, or as a magnetic recording medium for a magnetic storage apparatus employing the high-frequency-assist recording method such as the microwave-assisted recording method.

When using the magnetic recording medium as the magnetic recording medium for the magnetic storage apparatus employing the heat-assisted recording method, the magnetic recording medium preferably includes a heat sink layer. For example, a material having a high thermal conductivity, such as Ag, Cu, Al, Au, or alloys of such metals, may be used for the heat sink layer.

Second Embodiment

Next, a description will be given of an example of a configuration of the magnetic storage apparatus in this embodiment. Although this example of the magnetic storage apparatus in this embodiment employs the heat-assisted recording method, the recording method is not limited to the heat-assisted recording method. For example, the magnetic recording medium in the first embodiment described above may be used in the magnetic storage apparatus employing the microwave-assisted recording method.

The magnetic storage apparatus in this embodiment may use the magnetic recording medium in the first embodiment described above.

The magnetic storage apparatus may include a medium driving part to rotate the magnetic recording medium, and a magnetic head that includes an optical near-field generator provided on a tip end part thereof. The magnetic storage apparatus may further include a laser generator to heat the magnetic recording medium, a waveguide to guide laser light generated from the laser generator to the optical near field generator, a head driving part to move the magnetic head, and a processing system to process recording signals and reproduced signals.

FIG. 1 is a perspective view illustrating the magnetic storage apparatus in this second embodiment of the present invention.

The magnetic storage apparatus in this embodiment may have the configuration illustrated in FIG. 1, for example. More particularly, a magnetic storage apparatus 100 illustrated in FIG. 1 may include a magnetic recording medium 101, a medium driving part 102 to rotate the magnetic recording medium 101, a magnetic head 103, a head driving part 105 to move the magnetic head 103, and a processing system 105 to process recording signals that are to be recorded on the magnetic recording medium 101 and reproduced signals that are reproduced from the magnetic recording medium 101.

Figure 2:
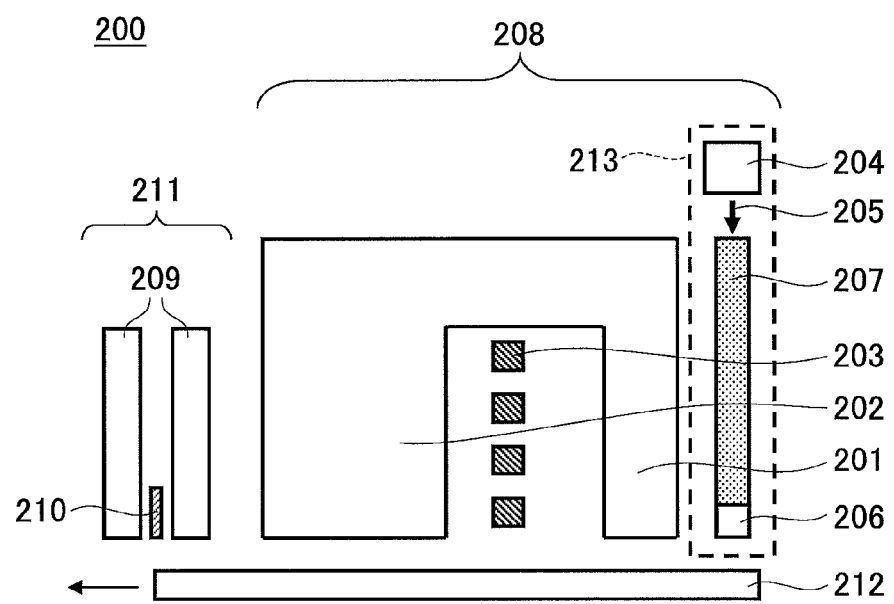
FIG. 2 is a diagram illustrating a configuration of a magnetic head in the second embodiment of the present invention.

The magnetic head 103 may be formed by a heat-assisted head 200 illustrated in FIG. 2, for example. FIG. 2 is a diagram illustrating a configuration of the magnetic head in this second embodiment of the present invention. The heat-assisted head 200 may include a recording head 208 and a reproducing head 211. The recording head 208 may include a main pole 201, an auxiliary pole 202, a coil 203 to generate a magnetic field, an LD (Laser Diode) 204 that forms the laser generator, and a waveguide 207 to guide laser light 205 generated from the LD 204 to the optical near-field generator 206. On the other hand, the reproducing head 211 may include a reproducing element 210 sandwiched by shields 209.

The magnetic recording medium in the first embodiment described above is used as the magnetic recording medium 100. For this reason, a high medium SNR can be achieved. In addition, an error rate of the magnetic storage apparatus 200 can be reduced.

Next, a description will be given of practical examples. However, the present invention is not limited to these practical examples, and various variations, modifications, and substitutions may be made without departing from the scope of the present invention.

Practical Examples Emb1

Figure 3:
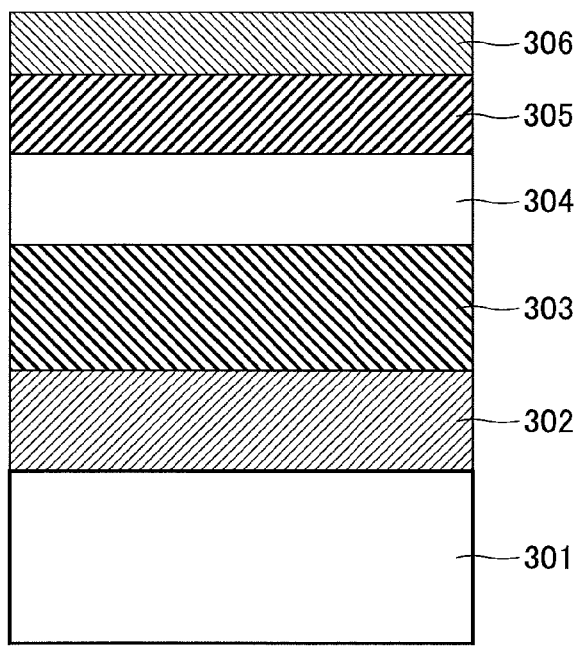
FIG. 3 is a cross sectional view schematically illustrating a configuration of a heat-assisted magnetic recording medium manufactured in practical examples emb1.

FIG. 3 is a cross sectional view schematically illustrating a configuration of a heat-assisted magnetic recording medium manufactured in practical examples emb1. The practical examples emb1 are manufactured by forming a Ni-50 at % Ta seed layer 302 having a thickness of 20 nm on a 2.5-inch (diameter) glass substrate 301, and performing a substrate heating at 300° C.

Thereafter, an underlayer made of materials illustrated in Table 2 is formed to a thickness of 20 nm as a first underlayer 303. In the practical examples Emb1, the material used for the first underlayer 303 is Cr-10 at % Mn in a practical example Emb1.1, Cr-15 at % Ru in a practical example Emb1.2, Cr-20 at % Ti in a practical example Emb1.3, Cr-30 at % Mo in a practical example Emb1.4, Cr-30 at % W in a practical example Emb1.5, Cr in a practical example Emb1.6, Cr-25 at % V in a practical example Emb1.7, Cr-5 at % B in a practical example Emb1.8, Cr-10 at % Ti-5 at % B in a practical example Emb1.9, Cr-15 at % Mo-3 at % B in a practical example Emb1.10, Ni-50 at % Al in a practical example Emb1.11, and Ru-50 at % Al in a practical example Emb1.12. In addition, in comparison examples Cmp1, the material used for the first underlayer 303 is Cr-10 at % Mn for a comparison example Cmp1.1, Cr-30 at % W for a comparison example Cmp1.2, and Cr-10 at % Ti-5 at % B for a comparison example Cmp1.3.

Next, an underlayer including $TiO_2$ is formed as a second underlayer 304. The second underlayer 304 is formed to a thickness of 2 nm for the samples of the practical examples Emb1.1 through Emb1.12. On the other hand, the second underlayer 304 including $TiO_2$ is not provided in the comparison examples Cmp1.1 through Cmp1.3, and a magnetic layer 305 to be described later is formed directly on the first underlayer 303.

Thereafter, a substrate heating at 640° C. is performed, and the magnetic layer 305 made of (Fe-55 at % Pt)-30 at % C is formed to a thickness of 6 nm.

A DLC protection layer 306 is further formed on a top surface of the magnetic layer 305 to a thickness of 3.5 nm.

The coercivity Hc and the normalized coercivity variance ΔHc/Hc of the fabricated magnetic recording media are then evaluated.

The coercivity Hc is estimated from a magnetization curve that is measured at room temperature by applying a maximum magnetic field 7 T. In addition, the normalized coercivity variance ΔHc/Hc is measured according to a method described in Ikuya Tagawa et al., "Relationship between high density recording performance and particle coercivity distribution", IEEE Trans. Magn., Vol. 27, No. 6, pp. 4975-4977, November 1991, for example.

Evaluation results are also illustrated in Table 2.

TABLE 2

| | 1st Underlayer 303 | 2nd Underlayer 304 | Hc (kOe) | ΔHc/Hc |
|---|---|---|---|---|
| Emb1.1 | Cr-10 at % Mn | $TiO_2$ | 40.5 | 0.33 |
| Emb1.2 | Cr-15 at % Ru | $TiO_2$ | 40.2 | 0.34 |
| Emb1.3 | Cr-20 at % Ti | $TiO_2$ | 36.6 | 0.34 |
| Emb1.4 | Cr-30 at % Mo | $TiO_2$ | 38.9 | 0.33 |
| Emb1.5 | Cr-30 at % W | $TiO_2$ | 41.1 | 0.35 |
| Emb1.6 | Cr | $TiO_2$ | 45.1 | 0.32 |
| Emb1.7 | Cr-25 at % V | $TiO_2$ | 39.1 | 0.33 |
| Emb1.8 | Cr-5 at % B | $TiO_2$ | 40.1 | 0.30 |
| Emb1.9 | Cr-10 at % Ti-5 at % B | $TiO_2$ | 38.9 | 0.29 |
| Emb1.10 | Cr-15 at % Mo-3 at % B | $TiO_2$ | 37.5 | 0.31 |
| Emb1.11 | Ni-50 at % Al | $TiO_2$ | 43.4 | 0.33 |
| Emb1.12 | Ru-50 at % Al | $TiO_2$ | 44.1 | 0.35 |
| Cmp1.1 | Cr-10 at % Mn | — | 22.8 | 0.44 |
| Cmp1.2 | Cr-30 at % W | — | 19.8 | 0.45 |
| Cmp1.3 | Cr-10 at % Ti-5 at % B | — | | |

According to the evaluation results illustrated in Table 2, it is confirmed that the magnetic recording medium in each of the practical examples Emb1.1 through Emb1.12 in accordance with the present invention can obtain a high coercivity Hc of 36 kOe or higher, and a low normalized coercivity variance ΔHc/Hc of 0.35 or lower.

Particularly when Cr, Ni-50 at % Al, and Ru-50 at % Al are used for the first underlayer 303 of the magnetic recording medium as in the case of the practical examples Emb1.6, Emb1.11, and Emb1.12, it is confirmed that a high coercivity Hc of 43 kOe or higher can be obtained.

In addition, when Cr-5 at % B, Cr-10 at % Ti-5 at % B, and Cr-15 at % Mo-3 at % B are used for the first underlayer 303 of the magnetic recording medium as in the case of the practical examples Emb1.8, Emb1.9, and Emb1.10, it is confirmed that a particularly low normalized coercivity variance ΔHc/Hc of 0.31 or lower can be obtained.

On the other hand, it is confirmed that the magnetic recording medium of each of the comparison examples Cmp1.1, Cmp1.2, and Cmp1.3 has a low coercivity Hc of 23 kOe or lower, and a high normalized coercivity variance ΔHc/Hc of 0.4 or higher.

From the evaluation results described above, it is confirmed that, by providing the underlayer 304 including $TiO_2$, a magnetic recording medium having a high coercivity Hc and a low normalized coercivity variance ΔHc/Hc can be obtained. In addition, the lower the normalized coercivity variance ΔHc/Hc, the higher the medium SNR. For this reason, it is confirmed that the magnetic recording medium in each of the practical examples Emb1.1 through Emb1.12 can obtain a high medium SNR.

Practical Examples Emb2

In practical examples Emb2, a third underlayer is provided between the first underlayer 303 and the second underlayer 304 including $TiO_2$. Otherwise, the configuration of the magnetic recording medium in the practical examples Emb2 is similar to that of the practical example Emb1.3 described above.

The third underlayer is formed to a thickness of 25 nm using materials illustrated in Table 3. In the practical examples Emb2, the material used for the third underlayer is W-10 at % Cr in a practical example Emb2.1, Mo-20 at % V in a practical example Emb2.2, W in a practical example Emb2.3, W-20 at % Ta in a practical example Emb2.4, Mo-50 at % Nb in a practical example Emb2.5, and Ta in a practical example Emb2.6.

Evaluation results of the coercivity Hc and the normalized coercivity variance ΔHc/Hc in the practical examples Emb2 are obtained for the fabricated magnetic recording media, in a manner similar to the evaluation results of the practical examples Emb1, as illustrated in Table 3.

TABLE 3

| | 1st Underlayer 303 | 3rd Underlayer | 2nd Underlayer 304 | Hc (kOe) | ΔHc/Hc |
|---|---|---|---|---|---|
| Emb2.1 | Cr-20 at % Ti | W-10 at % Cr | TiO$_2$ | 40.8 | 0.33 |
| Emb2.2 | Cr-20 at % Ti | Mo-20 at % V | TiO$_2$ | 40.1 | 0.32 |
| Emb2.3 | Cr-20 at % Ti | W | TiO$_2$ | 41.9 | 0.31 |
| Emb2.4 | Cr-20 at % Ti | W-20 at % Ta | TiO$_2$ | 44.2 | 0.30 |
| Emb2.5 | Cr-20 at % Ti | Mo-50 at % Nb | TiO$_2$ | 43.8 | 0.29 |
| Emb2.6 | Cr-20 at % Ti | Ta | TiO$_2$ | 43.3 | 0.33 |

According to the evaluation results illustrated in Table 3, it is confirmed that the magnetic recording medium in each of the practical examples Emb2.1 through Emb2.6 in accordance with the present invention can obtain a coercivity Hc higher than that obtained by the magnetic recording medium in the practical example Emb1.3, and a normalized coercivity variance ΔHc/Hc lower than that obtained by the magnetic recording medium in the practical example Emb1.3.

It is confirmed from X-ray crystallography (or X-ray diffraction measurements) performed with respect to the magnetic recording medium in each of the practical examples Emb2.1 through Emb2.6 that the third underlayer has a BCC structure and a (100) orientation. A lattice spacing $d_{200}$ estimated from a (200) diffraction peak of the third underlayer is 0.44 nm. In this case, a lattice mismatch between the third underlayer and the second underlayer 304 including TiO$_2$ is estimated to be 5% or less. It may be regarded that the magnetic recording medium in each of the practical examples Emb2.1 through Emb2.6 can obtain a coercivity Hc higher than that obtained by the magnetic recording medium in the practical example Emb1.3, and a normalized coercivity variance ΔHc/Hc lower than that obtained by the magnetic recording medium in the practical example Emb1.3, because of the reduced lattice mismatch between the third underlayer and the second underlayer 304 including TiO$_2$.

Practical Examples Emb3

Figure 4:
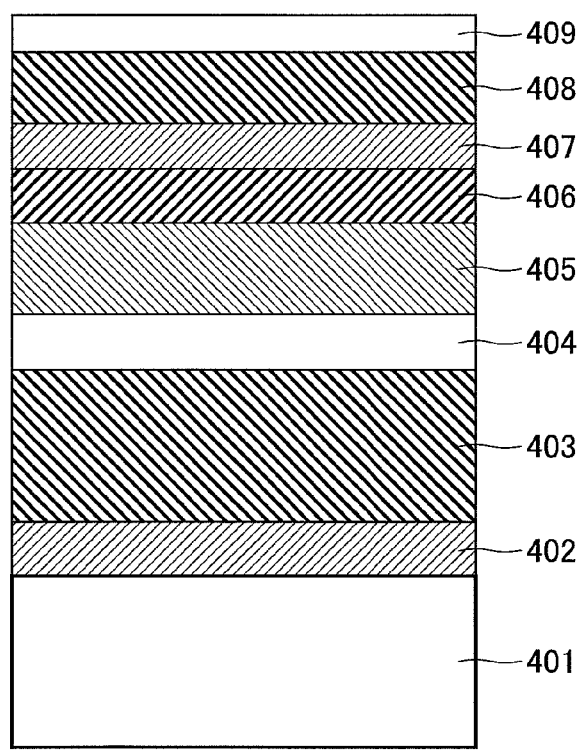
FIG. 4 is a cross sectional view schematically illustrating a configuration of a heat-assisted magnetic recording medium manufactured in practical examples emb3.

FIG. 4 is a cross sectional view schematically illustrating a configuration of a heat-assisted magnetic recording medium manufactured in practical examples emb3.

The practical examples emb3 are manufactured by forming a Cr-50 at % Ti bonding layer 402 having a thickness of 5 nm on a 2.5-inch (diameter) glass substrate 401, forming a Cu-0.4 at % Zr heat sink layer 403 having a thickness of 50 nm on the bonding layer 402, forming a Ni-50 at % Ta seed layer 404 having a thickness of 20 nm on the heat sink layer 403, and performing a substrate heating at 270° C.

Thereafter, an underlayer made of materials illustrated in Table 4 is formed to a thickness of 10 nm as a first underlayer 405. In the practical examples Emb3 and comparison examples Cmp3, the material used for the first underlayer 405 is Cr in a practical example Emb3.1 and a comparison example Cmp3.1, Cr-20 at % V in a practical example Emb3.2 and a comparison example Cmp3.2, and Cr-10 at % Ru in practical examples Emb3.3 through Emb3.5 and comparison examples Cmp3.3 through Cmp3.5.

Next, an underlayer made of materials illustrated in Table 4 is formed to a thickness of 4 nm as a second underlayer 406. In the practical examples Emb3 and comparison examples Cmp3, the material used for the second underlayer 406 is TiN in the practical examples Emb3.1 through Emb3.3 and the comparison examples Cmp3.1 through Cmp3.3, TiC in the practical example Emb3.4 and the comparison example Cmp3.4, and MgO in the practical example Emb3.5 and the comparison example Cmp3.5.

Further, in the practical examples Emb3.1 through Emb3.5, an underlayer made of TiO$_2$ is formed to a thickness of 2 nm as a third underlayer 407 including TiO$_2$. On the other hand, the third underlayer 407 including TiO$_2$ is not provided in the comparison examples Cmp3.1 through Cmp1.5, and a magnetic layer 408 to be described later is formed directly on the second underlayer 406.

Thereafter, a substrate heating at 680° C. is performed, and the magnetic layer 408 made of (Fe-50 at % Pt)-50 at % C is formed to a thickness of 6 nm. A DLC protection layer 409 is further formed on a top surface of the magnetic layer 408 to a thickness of 3 nm.

The coercivity Hc and the normalized coercivity variance ΔHc/Hc of the fabricated magnetic recording media are then evaluated, in a manner similar to the evaluation results of the practical examples Emb1, as illustrated in Table 4.

TABLE 4

| | 1st Underlayer 405 | 2nd Underlayer 406 | 3rd Underlayer 407 | Hc (kOe) | ΔHc/Hc |
|---|---|---|---|---|---|
| Emb3.1 | Cr | TiN | TiO$_2$ | 45.1 | 0.33 |
| Emb3.2 | Cr-20 at % V | TiN | TiO$_2$ | 43.3 | 0.34 |
| Emb3.3 | Cr-10 at % Ru | TiN | TiO$_2$ | 41.9 | 0.31 |
| Emb3.4 | Cr-10 at % Ru | TiC | TiO$_2$ | 42.1 | 0.35 |
| Emb3.5 | Cr-10 at % Ru | MgO | TiO$_2$ | 43.3 | 0.29 |
| Cmp3.1 | Cr | TiN | - | 17.1 | 0.42 |
| Cmp3.2 | Cr-20 at % V | TiN | - | 19.3 | 0.44 |
| Cmp3.3 | Cr-10 at % Ru | TiN | - | 21.1 | 0.43 |
| Cmp3.4 | Cr-10 at % Ru | TiC | - | 22.8 | 0.44 |
| Cmp3.5 | Cr-10 at % Ru | MgO | - | 20.5 | 0.40 |

According to the evaluation results illustrated in Table 4, it is confirmed that the magnetic recording medium in each of the practical examples Emb3.1 through Emb3.5 in accordance with the present invention can obtain a high coercivity Hc of 41 kOe or higher, and a low normalized coercivity variance ΔHc/Hc of 0.35 or lower.

Particularly the magnetic recording medium in the practical example Emb3.1 using Cr for the first underlayer 405 has a high coercivity Hc, and particularly the magnetic recording medium in the practical example Emb3.5 using MgO for the second underlayer 406 has a low normalized coercivity variance ΔHc/Hc.

On the other hand, it is confirmed that the magnetic recording medium of each of the comparison examples Cmp3.1 through Cmp3.5, in which no third underlayer 407 including TiO$_2$ is provided, has a low coercivity Hc of 23 kOe or lower, and a high normalized coercivity variance ΔHc/Hc of 0.4 or higher.

From the evaluation results described above, it is confirmed that, by providing the third underlayer 407 including TiO$_2$, a magnetic recording medium having a high coercivity Hc and a low normalized coercivity variance ΔHc/Hc can be obtained. In addition, the lower the normalized coercivity variance ΔHc/Hc, the higher the medium SNR. For this reason, it is confirmed that the magnetic recording medium in each of the practical examples Emb3.1 through Emb3.5 can obtain a high medium SNR.

Practical Examples Emb4

In practical examples Emb4, the magnetic layer 408 is formed by a stacked structure including a first magnetic layer and a second magnetic layer formed on the first magnetic layer. Otherwise, the configuration of the magnetic recording medium in the practical examples Emb4 is similar to that of the practical example Emb3.1 described above.

The first magnetic layer is formed using magnetic materials illustrated in Table 5 having different $TiO_2$-contents for practical examples Emb4.1 through Emb4.6. In addition, the second magnetic layer is formed using (Fe-50 at % Pt)-50 at % C, identical to that used for the magnetic layer 408 in the practical example Emb3.1, for the practical examples Emb4.1 through Emb4.6. The first magnetic layer is formed to a thickness of 5 nm, and the second magnetic layer is formed to a thickness of 4 nm.

The coercivity Hc and the normalized coercivity variance ΔHc/Hc of the fabricated magnetic recording media are then evaluated, in a manner similar to the evaluation results of the practical examples Emb1, as illustrated in Table 5.

TABLE 5

| | 1st Magnetic Layer | 2nd Magnetic Layer | Hc (kOe) | ΔHc/Hc |
|---|---|---|---|---|
| Emb4.1 | (Fe-45 at % Pt)-5 mol % $TiO_2$ | (Fe-55 at % Pt)-50 at % C | 44.2 | 0.34 |
| Emb4.2 | (Fe-45 at % Pt)-8 mol % $TiO_2$ | (Fe-55 at % Pt)-50 at % C | 47.3 | 0.32 |
| Emb4.3 | (Fe-45 at % Pt)-12 mol % $TiO_2$ | (Fe-55 at % Pt)-50 at % C | 48.9 | 0.29 |
| Emb4.4 | (Fe-45 at % Pt)-20 mol % $TiO_2$ | (Fe-55 at % Pt)-50 at % C | 49.2 | 0.30 |
| Emb4.5 | (Fe-45 at % Pt)-30 mol % $TiO_2$ | (Fe-55 at % Pt)-50 at % C | 48.1 | 0.31 |
| Emb4.6 | (Fe-45 at % Pt)-35 mol % $TiO_2$ | (Fe-55 at % Pt)-50 at % C | 42.5 | 0.35 |

According to the evaluation results illustrated in Table 5, it is confirmed that the magnetic recording medium in each of the practical examples Emb4.1 through Emb4.5 in accordance with the present invention can obtain a high coercivity Hc of 42 kOe or higher, and a low normalized coercivity variance ΔHc/Hc of 0.35 or lower. Particularly the magnetic recording medium in the practical examples Emb4.2 through Emb4.5 in which the $TiO_2$-content of the first magnetic layer is 8 mol % or higher and 30 mol % or lower has a high coercivity Hc and a low normalized coercivity variance ΔHc/Hc.

Accordingly, it is confirmed that, by employing the stacked structure (two-layer structure) for the magnetic layer and forming the first magnetic layer of the stacked structure to have a $SiO_2$-content of 8 mol % or higher and 30 mol % or lower, a high coercivity Hc and a low normalized coercivity variance ΔHc/Hc can be obtained by the magnetic recording medium.

Practical Examples Cmp5

In practical examples Emb5, the magnetic recording media in the practical examples Emb3.1 through Emb3.5 and the comparison examples Cmp3.1 through Cmp3.5 are coated with a lubricant made of a perfluoropolyether fluorocarbon polymer, and RW (Read-Write) characteristics are evaluated using the heat-assisted head 200 illustrated in FIG. 2.

The heat-assisted head 200 illustrated in FIG. 2 includes the recording head 208 and the reproducing head 211. The recording head 208 includes the main pole 201, the auxiliary pole 202, the coil 203 to generate the magnetic field, the LD (Laser Diode) 204 that forms the laser generator, and the waveguide 207 to guide the laser light 205 generated from the LD 204 to the optical near-field generator 206. On the other hand, the reproducing head 211 includes the reproducing element 210 sandwiched by the shields 209. The magnetic recording medium 212 is heated by the optical near-field generated by the optical near-field generator 206, in order to reduce the coercivity of the magnetic recording medium 212 to the head magnetic field or less and perform the recording at the reduced coercivity.

Table 6 illustrates the medium SNR measured using the heat-assisted head 200 to record signals having a pattern in which the bits are all "1"s at a linear recording density of 1600 kFCI, and a track width MWW defined as a half-width of a track profile. Power input to the LD 204 is set so that the MWW becomes approximately 55 nm.

TABLE 6

| | 1st Underlayer 405 | 3rd Underlayer 406 | 2nd Underlayer 407 | Medium SNR (dB) | MWW (nm) |
|---|---|---|---|---|---|
| Emb3.1 | Cr | TiN | $TiO_2$ | 13.2 | 55.4 |
| Emb3.2 | Cr-20 at % V | TiN | $TiO_2$ | 12.8 | 56.1 |
| Emb3.3 | Cr-10 at % Ru | TiN | $TiO_2$ | 12.5 | 55.1 |
| Emb3.4 | Cr-10 at % Ru | TiC | $TiO_2$ | 12.2 | 55.9 |
| Emb3.5 | Cr-10 at % Ru | MgO | $TiO_2$ | 13.5 | 54.4 |
| Cmp3.1 | Cr | TiN | - | 8.9 | 55.3 |
| Cmp3.2 | Cr-20 at % V | TiN | - | 9.3 | 54.1 |
| Cmp3.3 | Cr-10 at % Ru | TiN | - | 9.1 | 54.9 |
| Cmp3.4 | Cr-10 at % Ru | TiC | - | 9.0 | 56.7 |
| Cmp3.5 | Cr-10 at % Ru | MgO | - | 9.4 | 55.1 |

According to the measured results illustrated in Table 6, it is confirmed that the magnetic recording medium in each of the practical examples Emb3.1 through Emb3.5 in accordance with the present invention can obtain a high medium SNR of 12 dB or higher. It is confirmed that particularly the magnetic recording medium in each of the practical examples Emb3.1 and Emb3.5 can obtain a high medium SNR of 13 dB or higher.

On the other hand, it is confirmed that the magnetic recording medium in each of the comparison examples Cmp3.1 through Cmp3.5 can only obtain a low medium SNR of 9.5 or lower.

Accordingly, it is confirmed that a magnetic recording medium having a high medium SNR can be obtained by using a $TiO_2$ underlayer.

Practical Examples Emb6

In practical examples Emb6, the magnetic recording media in the practical examples Emb3.1 through Emb3.5 and the comparison examples Cmp3.1 through Cmp3.5 are set in the magnetic storage apparatus 100 illustrated in FIG. 1, and a BER (Bit Error Rate) is evaluated.

The magnetic storage apparatus 100 used in the evaluation of the BER includes the magnetic recording medium 101, the medium driving part 102, the magnetic head 103, the head driving part 104, and the processing system 105, as described above. The magnetic head 103 uses the heat-assisted head 200 illustrated in FIG. 2 and used to evaluate the practical examples Emb5 described above. In addition, the magnetic recording medium 101 is coated with a lubricant made of a perfluoropolyether fluorocarbon polymer.

Table 7 illustrates logarithmic values of the BER, namely, log BER, evaluated under conditions in which the linear recording density is 1600 kFCI and the track density is 500 kFCI (that is, the surface recording density is 800 Gbits/inch$^2$).

TABLE 7

|  | 1st Underlayer 405 | 3rd Underlayer 406 | 2nd Underlayer 407 | logBER |
|---|---|---|---|---|
| Emb3.1 | Cr | TiN | TiO$_2$ | −7.1 |
| Emb3.2 | Cr-20 at % V | TiN | TiO$_2$ | −6.8 |
| Emb3.3 | Cr-10 at % Ru | TiN | TiO$_2$ | −6.6 |
| Emb3.4 | Cr-10 at % Ru | TiC | TiO$_2$ | −6.9 |
| Emb3.5 | Cr-10 at % Ru | MgO | TiO$_2$ | −7.3 |
| Cmp3.1 | Cr | TiN | - | −4.4 |
| Cmp3.2 | Cr-20 at % V | TiN | - | −4.1 |
| Cmp3.3 | Cr-10 at % Ru | TiN | - | −4.1 |
| Cmp3.4 | Cr-10 at % Ru | TiC | - | −4.2 |
| Cmp3.5 | Cr-10 at % Ru | MgO | - | −4.8 |

According to the evaluation results illustrated in Table 7, it is confirmed that the magnetic storage apparatus set with (or having assembled therein) the magnetic recording medium in each of the practical examples Emb3.1 through Emb3.5 in accordance with the present invention can obtain a low BER of $1 \times 10^{-6.6}$ or lower. It is confirmed that particularly the magnetic storage apparatus set with magnetic recording medium in each of the practical examples Emb3.1 and Emb3.5 can obtain a low BER of $1 \times 10^{-7}$ or lower. On the other hand, it is confirmed that the magnetic storage apparatus set with the magnetic recording medium in each of the comparison examples Cmp3.1 through Cmp3.5 can only obtain a BER on the order of $1 \times 10^{-4}$.

Accordingly, it is confirmed that a magnetic storage apparatus having a low BER can be obtained by setting (or assembling) therein a magnetic recording medium provided with an underlayer including TiO$_2$.

According to the embodiments and practical examples described above, the magnetic recording medium can have a high medium SNR.

What is claimed is:

1. A magnetic recording medium comprising:
   a substrate;
   a magnetic layer including a FePt alloy having a L1$_0$ type structure; and
   a plurality of underlayers arranged between the substrate and the magnetic layer,
   wherein at least a first underlayer amongst the plurality of underlayers consists of TiO$_2$, and
   wherein the magnetic layer is provided directly on the first underlayer.

2. The magnetic recording medium as claimed in claim 1, wherein
   the plurality of underlayers includes a second underlayer made of Cr or an alloy having a BCC (Body-Centered Cubic) structure and including Cr as a primary component of the alloy, and
   the first underlayer is provided on the second underlayer.

3. The magnetic recording medium as claimed in claim 1, wherein
   the plurality of underlayers includes a second underlayer made of a material having a BCC (Body-Centered Cubic) structure, and
   the first underlayer is provided on the second underlayer.

4. The magnetic recording medium as claimed in claim 1, wherein
   the plurality of underlayers includes a second underlayer made of a material having an NaCl type structure, and
   the first underlayer is provided on the second underlayer.

5. The magnetic recording medium as claimed in claim 4, wherein the material is MgO.

6. The magnetic recording medium as claimed in claim 1, wherein the first underlayer is made of rutile type TiO$_2$, and has an orientation in which a (100) face is parallel to a surface of the substrate.

7. The magnetic recording medium as claimed in claim 1, wherein the magnetic layer includes the FePt alloy having the L1$_0$ type structure as a primary component of the magnetic layer, and one or more kinds of elements selected from a group of elements consisting of SiO$_2$, TiO$_2$, Cr$_2$O$_3$, Al$_2$O$_3$, Ta$_2$O$_5$, ZrO$_2$, Y$_2$O$_3$, CeO$_2$, MnO, TiO, ZnO, C, B, B$_2$O$_3$, and BN.

8. The magnetic recording medium as claimed in claim 1, wherein the magnetic layer includes
   a first magnetic layer including the FePt alloy having the L1$_0$ type structure as a primary component of the first magnetic layer, and TiO$_2$ amounting to 8 mol % or higher and 30 mol % or lower, and
   a second magnetic layer including the FePt alloy having the L1$_0$ type structure as a primary component of the second magnetic layer, and one or more kinds of elements selected from a group of elements consisting of SiO$_2$, TiO$_2$, Cr$_2$O$_3$, Al$_2$O$_3$, Ta$_2$O$_5$, ZrO$_2$, Y$_2$O$_3$, CeO$_2$, MnO, TiO, ZnO, C, B, B$_2$O$_3$, and BN.

9. A magnetic storage apparatus comprising:
   a magnetic recording medium; and
   a magnetic head configured to recording information on and reproduce information from the magnetic recording medium,
   wherein the magnetic recording medium includes a substrate, a magnetic layer including a FePt alloy having a L1$_0$ type structure, and a plurality of underlayers arranged between the substrate and the magnetic layer, and
   wherein at least a first underlayer amongst the plurality of underlayers consists of TiO$_2$, and
   wherein the magnetic layer is provided directly on the first underlayer.

10. The magnetic storage apparatus as claimed in claim 9, wherein
    the plurality of underlayers includes a second underlayer made of Cr or an alloy having a BCC (Body-Centered Cubic) structure and including Cr as a primary component of the alloy, and
    the first underlayer is provided on the second underlayer.

11. The magnetic storage apparatus as claimed in claim 9, wherein
    the plurality of underlayers includes a second underlayer made of a material having a BCC (Body-Centered Cubic) structure, and
    the first underlayer is provided on the second underlayer.

12. The magnetic storage apparatus as claimed in claim 9, wherein the plurality of underlayers includes a second underlayer made of a material having an NaCl type structure, and the first underlayer is provided on the second underlayer.

13. The magnetic storage apparatus as claimed in claim 12, wherein the material is MgO.

14. The magnetic storage apparatus as claimed in claim 9, wherein the first underlayer is made of rutile type $TiO_2$, and has an orientation in which a (100) face is parallel to a surface of the substrate.

* * * * *